United States Patent Office 2,930,772
Patented Mar. 29, 1960

2,930,772

ADHESIVE INGREDIENT AND PROCESS

Robert M. Williams, Bellevue, and Gene F. Baxter, Seattle, Wash., assignors to American-Marietta Company, Adhesive Resin and Chemical Division, Seattle, Wash., an Illinois corporation No Drawing. Application September 24, 1956
Serial No. 611,750

10 Claims. (Cl. 260—17.2)

This invention relates to an adhesive ingredient, to the process for producing the same and to the compounding of adhesives. More particularly the invention involves a tree-bark constituent, heat-reacted in an aqueous alkaline medium in the presence of alkalis. Also the invention is concerned with the compounding of a fast curing hot-press adhesive.

An adhesive ingredient involving tree-bark and sodium hydroxide cooked together is known to the prior art as shown by the Heritage Patent No. 2,574,785, issued November 13, 1951. In general this patent disclosure teaches the process of treating a tree-bark component to produce a resinous product by bringing the bark component together, in an aqueous solution, with a basic acting compound and heat reacting at temperatures in the range of from about 150° F. to about 200° F. The result of this reaction is commonly referred to in the plywood adhesive field as an adhesive "pre-mix." A thermo-setting resin is normally mixed with the resulting reaction product to produce an adhesive. This material is then applied for bonding plies of veneer into a plywood board or other laminated construction.

In practising the prior teaching of Heritage serious difficulties have been encountered in the plywood mills when it was attempted to spread the adhesive composition on the veneer, except when low-advanced, low molecular weight, artificially thickened, slow curing resins were used. When highly advanced, high molecular weight, fast cure, phenol-formaldehyde resins were incorporated difficulties were encountered. Such highly-advanced resins necessarily require considerably more water of dilution than do low-advanced resins and hence introduce more water into the glue mix for a given amount of resin solids. The resulting glue is excessively diluted and has a low viscosity. In view of the large particle size of extender as resulted from the Heritage process, the low viscosity glue did not spread in a desirable, uniform film on the veneer. Gluing problems were encountered, such as severe and undesirable filtration, separation, migration and consequent starvation of the glue line; and generally unsatisfactory bonding results were obtained in plywood production.

It was noted that bark adhesives in a plywood mill gluespreader acquired an increase in extender solids in the glue pot from the beginning of a spreading operation to its conclusion. This increase was noticeable after very few panels of veneer had been spread and became more pronounced throughout the spreading of substantially all of the glue in the pot. This "separation" of the solid extender from the liquid phase is enhanced in glues of low viscosity. As separation takes place the swelled, treebark particles also tended to accumulate on the glue spreader rolls and were not uniformly transferred with the liquid film onto the veneer. As a result of excessive particle accumulation on the spreader rolls, gobs of bark particles were sporadically deposited in an undesirable manner on the veneer. At the same time the glue film being laid down had an undesirably low order of viscosity and, of course, was not properly extended in a desired uniform manner.

To demonstrate the difficulties encountered as outlined the following example was run.

EXAMPLE I

In a glue kettle 160 parts of water at 185° F. add 50 parts of Silvacon WT-472, a bark component as described hereafter was added thereto and these materials were mixed for two minutes. 22.5 parts soda ash were next added and mixing continued for another two minutes. Then 36 parts of a 50% sodium hydroxide solution was introduced to the mixture followed by mixing for one minute. Then 40 parts more of Silvacon WT-472 was added. Under conditions of constant stirring and agitation the mixture was cooked at 190°–200° F. for 25 minutes whereupon cooling was instituted and 3 parts of diesel oil was added. Cooling and agitation continued until the temperature was reduced to 120° F. Then 500 parts of a high molecular weight, highly advanced, fast cure-time resin of the Redfern type was added and mixed into the premix and the mass was cooled until the temperature was lowered to between 80° F. to 90° F.

Plywood panels were assembled from veneer and were pressed into two thicknesses, $5/16''$-3 ply, and $13/16''$-5 ply. Standard plywood shear-specimens were tested in accordance with the Commercial Standard CS–45–48 (U.S. Dept. of Commerce). Wood failure under testing of the $5/16''$ panel specimens showed an average 66% wood failure. The $13/16''$ panel specimens averaged 60% wood failure.

Examination of the wet glue lines showed poor flow characteristics and the glue was extremely sensitive to practical assembly times as prevail in the mills. Testing the panel specimens clearly showed that they did not meet the commercial standards for an adhesive for exterior grade plywood which, of course, was the objective of the production.

The foregoing adhesive, while it had a desirably short hot-press time of about $7\frac{1}{2}$ minutes for $13/16''$-5 ply panels at about 285° F., showed the undesirable characteristics mentioned. The problem was then noted to be one of retaining the short press time inherent with the Redfern-type resins while at the same time providing sufficient viscosity to reduce separation and migration.

The tree-bark components referred to herein are those more fully described in the Heritage patent mentioned above. Essentially the components are derived from Douglas-fir bark and include the cork and fiber fractions of the bark. The material is dark colored, usually brown or reddish brown, is pulverulent, and essentially comprises the parenchyma tissue of bark phloem. Its specific gravity is approximately 1.44 and it contains from about 25% to 30% cellulose and approximately 55% to 65% lignin. The remainder of the bark component is made up of wax, flavanol-type compound and ash. The bark particle sizes are those of very finely ground materials. The bark component has a relatively low order of solubility in water and ether, but is soluble in a 2% caustic solution in the range between about 68% and 78%. In an aqueous medium the pH of the bark component is normally between 3.7 and 4.0. Chemically the tree-bark component includes 52%–53% carbon, 5.7–6.1% hydrogen, approximately 40% oxygen and approximately 0.2% nitrogen as determined according to the Kjeldahl process.

Desirable materials of the type described above, include the product Silvacon WT-472, a proprietary product.

We have discovered that the above described bark product surprisingly is reactive with aldehydic materials in aqueous-alkaline medium. Typical of such aldehydic materials are formaldehyde, paraformaldehyde, furfuraldehyde, and a related material, hexamethylenetetramine.

This reactivity is manifested in a substantial thickening of the bark component when cooked in an aqueous-alkaline medium.

In a standard formulation, later described, the various aldehydic materials, used in equimolar amounts, produced the desirable viscosity increases set forth in the following table:

Table A

| Aldehyde | Amount, gms. | Viscosity | |
|---|---|---|---|
| | | MacMichael [1] | High Shear [2] |
| None | 00 | 9 | Below 3.0 |
| Paraformaldehyde | 10 | 43 | 5.3 |
| 37 Formaldehyde | 27 | 23 | 5.3 |
| Furfuraldehyde | 32 | 19 | 3.8 |

[1] "MM" means MacMichael viscometer reading which sample produced when tested with a spindle on a #26 wire rotating at 20 r.p.m. at 77° F.
[2] "HS" means high-shear viscosity reading in units produced on a Hercules type Hi-Shear viscometer rotating at 1500 r.p.m. at 77° F.

The chemical reaction between the finally comminuted tree-bark, the aldehydic material, and sodium hydroxide is carried forward in an aqueous solution. Desirable ratios for the components of the cooking mass are as follows:

Bark to $H_2O$ _____ From 1:1.5 to 1:3.0.
Bark to NaOH _____ From 2.0:1 to 6.6:1.
Bark to aldehyde _____ From 15:1 to 40:1.

The preparation of the premix ingredient for subsequent compounding into an adhesive composition in accordance with this invention is illustrated by the following general statement of procedure:

An aqueous solution of sodium hydroxide containing finely comminuted tree-bark is prepared in which the proportion of sodium hydroxide solids to tree-bark solids is in the range above stated. The aldehyde is then added in the range mentioned above. The water temperature is preferably about 180° F. in order to insure that the caustic rapidly go into solution and that the bark component readily mix with the water. The mixture of ingredients is placed in a kettle or other reaction vessel and heat is applied thereto. It is desirable that the kettle be jacketed and the heat supplied in the form of steam within the jacket to the kettle wall under conditions whereby relatively close control can be maintained of temperatures obtained within the reaction mass.

Upon the application of external heat to the mixture, in addition to that derived from the hot water and that produced exothermically, the temperature of the mass may be raised to within the range of about 180° F. to 230° F. When such elevated temperature is obtained, the mass is held at the attained temperature for approximately five to sixty minutes. During all of such time agitation or mechanical mixing of the reacting mass must be carried on within the kettle to insure uniform reaction. Under conditions that have been described herein the reaction is completed within the time period specified and after cooling to below about 150° F. the resulting permix product is ready to be compounded into a plywood adhesive, by the addition of a resin.

Various cure accelerators for the resin may be added. Such are sodium carbonate, sodium borate, and various chromium salts. Typical chromium salts are described in U.S. Patents 2,592,659 and 2,612,481.

An adhesive having superior qualities for interior and exterior plywood production is obtained by the addition to the reacted mass of a thermo-setting resin. We prefer to employ a phenol-formaldehyde thermosetting resin of the type that is commonly referred to as "highly alkaline," has a high molecular weight, is highly advanced toward the C-stage, and is fast setting under conditions of heat and pressure. It is preferable, in compounding an adhesive from the foregoing described reaction mass, to employ an alkaline phenol-formaldehyde resin in which the alkali-to-resin solids ratio is from about 1:4 to about 1:10.

Typical of such a resin is one well-known in the plywood and board-making industry as the "Redfern" resin, which has the following characteristics:

This resin is a phenol-aldehyde condensation product. It is heat fusible and water soluble and is the reaction product formed by heat-reacting an aqueous mixture of a monohydric phenol having a distillation range between about 175° and about 225° C., an aldehyde in which the aldehyde radical is the sole reactive radical, and an alkaline catalyst in an amount that accelerates the formation of the resin-reaction product. In such a resin the molar ratio of aldehyde to phenol may be from 1:1 to 3:1. Marked advancement of such a resin is obtained by multiple or repeated additions of alkali metal hydroxide between reaction steps during processing. The resin is normally ethanol-insoluble as well as water-soluble and is highly advanced toward the C-state. Such resin is highly alkaline, having a pH of about 11.0 to 12.0 and commercially is used in forms having from about 35% to about 50% resin solids. Suitable resins are described in Van Epps 2,360,376, Stephan et al. 2,437,981, and Redfern Re. 23,347 and the like.

The following typical formulation shows the process of this invention whereby a suitable and practical adhesive premix is obtained. Ingredients set forth in the examples are expressed as parts by weight.

EXAMPLE II

In a jacketed mixer, an aqueous alkaline solution was prepared by dissolving 32 parts of flake caustic soda in 32 parts of water. This was dispersed in 130 parts of water at 185° F. To this hot alkaline solution was added 90 parts of the bark component material as described herein, followed by 5 parts of paraformaldehyde. The mixture was agitated or stirred for approximately two minutes during which time the temperature was adjusted to cook the mixture at 212° F. Cooking while stirring was carried on at 212° F. for about twenty-five minutes by supplying steam to the jacket of the cooking vessel. By introducing cooling water, also to the jacket, it was possible to maintain the desired cooking temperature.

Following the cooking step cooling water was introduced into the jacket and the temperature of the mass lowered.

Occasionally, either during the cooking or following, a premix may exhibit undesirable foaming characteristics. In such an instance diesel oil as necessary may be added to reduce foaming.

When the reaction has been substantially completed and during the cooling of the premix 25 parts of soda ash was added and the mass stirred and cooled until a temperature of approximately 140° F. was obtained. To this premix 500 pounds of the Redfern-type phenol-aldehyde resin described above was added and the whole mass stirred and cooled until the compounded adhesive mass had reached a temperature of between 80° F. and 90° F.

The adhesive compound when cooled had a slick feeling, was very black, had a high degree of tack, and at the same time had a low order of separation on a glue spreader.

This adhesive, when introduced into the glue pot of a standard glue spreader in a commercial plywood mill, had a suitable viscosity. It readily filmed on the spreader rolls so that a glue line film could be applied to veneers at rates customary in the Douglas-fir plywood industry. Each face of veneer core was coated with adhesive and panels were assembled in the customary manner, with the core interposed between face veneers and with its grain disposed at right-angles to the grain of the face veneers. Suitable working life of the adhesive was noted through a spreading operation extending over about two hours.

Plywood subsequently assembled and pressed from this adhesive had a desirably low incidence of glue line failure and, in fact, was capable of fully meeting the Douglas-Fir Plywood Association (DFPA) requirements for exterior grades of Douglas-fir plywood.

The following was obtained by DFPA tests:

Table B

| Panel Construction | Top Panel [1] | Middle Top Panels | Middle Bottom Panels | Bottom Panels |
|---|---|---|---|---|
| 5/16″—3 ply | 93 | 100 | 94 | 100 |
| | 94 | 100 | 100 | 99 |
| 7/16″—3 ply | 93 | 89 | 98 | 100 |
| | 95 | 91 | 90 | 93 |
| 9/16″—5 ply | 92 | 99 | 82 | 95 |
| | 83 | 88 | 63 | 98 |
| 11/16″—5 ply | 86 | 98 | 93 | 100 |
| | 100 | 99 | 100 | 77 |
| 13/16″—5 ply | 96 | 79 | 60 | 60 |
| | 100 | 82 | 100 | 90 |
| Averages | 93.0 | 92.5 | 88.0 | 91.0 |

[1] The position of samples taken from a press load of plywood panels is indicated by top, middle top, middle bottom, and bottom. The top panels are comparable to short assembly time (3 and 20 minutes) panels in the laboratory and the bottom panels are comparable to long assembly time (60 and 120 minutes) panels in the laboratory.

EXAMPLE III

In order to demonstrate certain characteristics and advantages of the reaction process set forth herein, Mix 1 was made as follows:

```
H₂O at 185° F. minimum_____ 360
Bark component (silvacon WT-472)_____ 100
    Mix 2 minutes.
Soda ash (sodium carbonate)_____ 50
    Mix 2 minutes.
50% NaOH_____ 80
    Short stir.
Bark component (Silvacon WT-472)_____ 100
    Cook for 20 minutes at 200° F. (see proce-
        dures below). Cool to 140° F.
Diesel oil_____ 6
    Mix 5 minutes.
Resin (Redfern type)_____ 1124
    Mix until temperature between 80°–90° F.
```

Similarly Mix 2 was formulated identical with the foregoing Mix 1 except that, following the soda ash addition and prior to the caustic addition, 10 parts of paraformaldehyde was added followed by a 2 minute mixing.

The following table shows wood failure results obtained by conducting DFPA two-cycle boil tests on specimen plywood samples produced as indicated:

Table C

| Assembly Time | Press Time, Minutes | Mix #1 W. F. Results, percent | Mix #2 W. F. Results, percent |
|---|---|---|---|
| 120 Minutes | 9 | 54.0 | 67.0 |
| 60 Minutes | 9 | 63.0 | 93.5 |
| 20 Minutes | 7 | 65.5 | 63.0 |
| 20 Minutes | 7½ | 69.5 | 97.0 |
| 20 Minutes | 9 | 99.5 | 97.0 |
| 3 Minutes | 9 | 71.0 | 67.0 |
| Average W.F. Results | | 70.5 | 80.8 |

It is apparent that Mix 2 containing paraformaldehyde produced superior wood failure results as compared to an identical adhesive not containing such aldehydic material. In addition, superior viscosity and spreading conditions prevailed with Mix 2 over those encountered with Mix 1.

From the foregoing it will be apparent that we have shown methods of making a premix and of making an adhesive in which superior wood failure results are obtained with adhesives having suitable and desirable viscosity characteristics and operable to bond plywood veneer at hitherto unavailable short press times.

Having thus described our invention, we claim:

1. An adhesive premix consisting of the product derived from chemically reacting at elevated temperatures a finely divided Douglas-fir bark material in an aqueous-alkaline medium containing a reactive aldehyde selected from the group consisting of:

Paraformaldehyde,
Formaldehyde solution,
Furfuraldehyde, and
Hexamethylenetetramine;

in which reaction mass the alkali is selected from the group consisting of sodium hydroxide, and mixtures of sodium hydroxide and sodium carbonate; and the bark-to-water ratio is from 1:1.5 to 1:3, and the bark-to-alkali ratio is from 2.0:1 to 6.6:1, and the bark-to-aldehyde ratio is from 15:1 to 40:1; said chemical reaction being conducted at temperatures between about 180° F. and 230° F. for from 5 minutes to 60 minutes; and said mass being cooled following reaction to between room temperature and about 150° F.

2. An adhesive premix consisting of the product derived from chemically reacting at elevated temperatures a finely divided Douglas-fir bark material in an aqueous-alkaline medium containing a reactive aldehyde selected from the group consisting of:

Paraformaldehyde,
Formaldehyde solution,
Furfuraldehyde, and
Hexamethylenetetramine;

in which reaction mass the alkali is solely NaOH and the bark-to-water ratio is from 1:1.5 to 1:3, and the bark-to-alkali ratio is from 2.0:1 to 6.6:1, and the bark-to-aldehyde ratio is from 15:1 to 40:1; said chemical reaction being conducted at temperatures between about 180° F. and 230° F. for from 5 minutes to 60 minutes; and said mass being cooled following reaction to between room temperature and about 150° F.

3. An adhesive premix consisting of the product derived from chemically reacting at elevated temperatures a finely divided Douglas-fir bark material in an aqueous-alkaline medium containing paraformaldehyde; in which reaction mass the alkali is solely NaOH and the bark-to-water ratio is from 1:1.5 to 1:3, the bark-to-alkali ratio is from 2.0:1 to 6.6:1, and the bark-to-aldehyde ratio is from 15:1 to 40:1; said chemical reaction being conducted at temperatures between about 180° F. and 230° F. for from 5 minutes to 60 minutes; and said mass being cooled following reaction to between room temperature and about 150° F.

4. A process of compounding adhesive compositions, comprising: forming a mixture containing water and finely comminuted Douglas-fir bark material and an alkali and a reactive aldehyde selected from the group consisting of:

Paraformaldehyde,
Formaldehyde solution,
Furfuraldehyde, and
Hexamethylenetetramine;

in which reaction mass the alkali is selected from the group consisting of sodium hydroxide, and mixtures of sodium hydroxide and sodium carbonate; and the bark-to-water ratio is from 1:1.5 to 1:3, the bark-to-alkali ratio is from 2.0:1 to 6.6:1, and the bark-to-aldehyde ratio is from 15:1 to 40:1; conducting said reaction at temperatures between about 180° F. and 230° F. for from 5 minutes to about 60 minutes; cooling said mass to between room temperature and about 150° F.; and admixing with the cooled mass a phenol-aldehyde thermosetting resin, said resin being the alkaline highly advanced, heat fusible, ethanol-insoluble, water soluble reaction product of a phenol and an aldehyde heat reacted at a molar ratio between 1:1 and 1:3 in the presence of alkali metal hydroxide and having an alkali-to-resin solids ratio from about 1:4 to 1:10; and cooling the adhesive composition thus compounded to normal adhesive temperatures.

5. The adhesive product of the process of claim 4.

6. A process of compounding adhesive compositions, comprising: forming a mixture containing water and finely comminuted Douglas-fir bark material and an alkali and a reactive aldehyde selected from the group consisting of:

Paraformaldehyde,
Formaldehyde solution,
Furfuraldehyde, and
Hexamethylenetetramine;

in which reaction mass the alkali is solely NaOH and the bark-to-water ratio is from 1:1.5 to 1:3, the bark-to-alkali ratio is from 2.0:1 to 6.6:1, and the bark-to-aldehyde ratio is from 15:1 to 40:1; conducting said reaction at temperatures between about 180° F. and 230° F. for from 5 minutes to about 60 minutes; cooling said mass to between room temperature and about 150° F.; and admixing with the cooled mass a phenol-aldehyde thermosetting resin, said resin being the alkaline highly advanced, heat fusible, ethanol-insoluble, water soluble reaction product of a phenol and an aldehyde heat reacted at a molar ratio between 1:1 and 1:3 in the presence of alkali metal hydroxide and having an alkali-to-resin solids ratio from about 1:4 to 1:10; and cooling the adhesive composition thus compounded to normal adhesive temperatures.

7. A process of compounding adhesive compositions, comprising: forming a mixture containing water and finely comminuted Douglas-fir bark material and an alkali and paraformaldehyde; in which reaction mass the alkali is selected from the group consisting of sodium hydroxide, and mixtures of sodium hydroxide and sodium carbonate; and the bark-to-water ratio is from 1:1.5 to 1:3, the bark-to-alkali ratio is from 2.0:1 to 6.6:1, and the bark-to-aldehyde ratio is from 15:1 to 40:1; conducting said reaction at temperatures between about 180° F. and 230° F. for from 5 minutes to about 60 minutes; cooling said mass to between room temperature and about 150° F.; and admixing with the cooled mass a phenol-aldehyde thermosetting resin, said resin being the alkaline highly advanced, heat fusible, ethanol-insoluble, water soluble reaction product of a phenol and an aldehyde heat reacted at a molar ratio between 1:1 and 1:3 in the presence of alkali metal hydroxide and having an alkali-to-resin solids ratio from about 1:4 to 1:10; and cooling the adhesive composition thus compounded to normal adhesive temperatures.

8. A process of compounding adhesive compositions, comprising: forming a mixture containing water and finely comminuted Douglas-fir bark material and an alkali and paraformaldehyde; in which reaction mass the alkali is solely NaOH and the bark-to-water ratio is from 1:1.5 to 1:3, the bark-to-alkali ratio is from 2.0:1 to 6.6:1, and the bark-to-aldehyde ratio is from 15:1 to 40:1; conducting said reaction at temperatures between about 180° F. and 230° F. for from 5 minutes to about 60 minutes; cooling said mass to between room temperature and about 150° F.; and admixing with the cooled mass a phenol-aldehyde thermosetting resin, said resin being the alkaline highly advanced, heat fusible, ethanol-insoluble, water-soluble reaction product of a phenol and an aldehyde heat reacted at a molar ratio between 1:1 and 1:3 in the presence of alkali metal hydroxide and having an alkali-to-resin solids ratio from about 1:4 to 1:10; and cooling the adhesive composition thus compounded to normal adhesive temperatures.

9. A process of compounding adhesive compositions, comprising: introducing finely comminuted Douglas-fir bark material into an aqueous-alkaline medium containing paraformaldehyde; in which reaction mass the alkali is solely NaOH and the bark-to-water ratio is 1:1.8, the bark-to-alkali ratio is 2.8:1, and the bark-to-aldehyde ratio is 33.3:1; conducting said reaction at about 215° F. for from 20 minutes to about 30 minutes; cooling said mass to between room temperature and about 150° F.; and admixing with the cooled mass a phenol-aldehyde thermosetting resin, said resin being the alkaline highly advanced, heat fusible, ethanol-insoluble, water-soluble reaction product of a phenol and an aldehyde heat reacted at a molar ratio between 1:1 and 1:3 in the presence of alkali metal hydroxide and having an alkali-to-resin solids ratio from about 1:4 to 1:10; and cooling the adhesive composition thus compounded to normal adhesive temperatures.

10. An adhesive premix consisting of the product derived from chemically reacting at elevated temperatures a finely divided Douglas-fir bark material in an aqueous-alkaline medium containing paraformaldehyde; in which reaction mass the alkali is solely NaOH and the back-to-water ratio is 1:1.8, and the bark-to-alkali ratio is 2.8:1, and the bark-to-aldehyde ratio is 33.3:1; said chemical reaction being conducted at temperatures at about 215° F. for from 20 minutes to 30 minutes; and said mass being cooled following reaction to between room temperature and about 150° F.

References Cited in the file of this patent

UNITED STATES PATENTS

| | | |
|---|---|---|
| 2,440,789 | Vander Pyl | May 4, 1948 |
| 2,574,784 | Heritage | Nov. 13, 1951 |
| 2,574,803 | Van Beckum et al. | Nov. 13, 1951 |